United States Patent [19]
Lee et al.

[11] B 3,924,017
[45] Dec. 2, 1975

[54] SWEETNESS INDUCER

[75] Inventors: Chi-Hang Lee, Spring Valley, N.Y.; Richard John Scarpellino, Ramsey, N.J.; Marjorie Mary Murtagh, Bronx, N.Y.

[73] Assignee: General Foods Corporation, White Plains, N.Y.

[22] Filed: Feb. 14, 1973

[21] Appl. No.: 332,527

[44] Published under the Trial Voluntary Protest Program on January 28, 1975 as document no. B 332,527.

Related U.S. Application Data

[63] Continuation-in-part of Ser. No. 276,271, July 28, 1972, abandoned.

[52] U.S. Cl. .................... 426/548; 426/3; 426/590; 260/210; 260/439
[51] Int. Cl.² ............................................ A23L 1/22
[58] Field of Search .. 260/210, 439; 99/141, 141 A, 99/135; 426/217, 190

[56] References Cited
UNITED STATES PATENTS
3,676,149   7/1972   Fennel et al. ..................... 99/141 R OTHER PUBLICATIONS
Merck 8th Ed., Merck & Co., Inc., Rahway, N.J., 1968, p. 316.
Merck 8th ed., Merck & Co., Inc., Rahway, N.J., 1968, p. 243.
Chem. Absts. Vol. 67, 1967, 72 605g.

*Primary Examiner*—Jeanette M. Hunter
*Attorney, Agent, or Firm*—Daniel J. Donovan; Doris M. Bennett

[57] ABSTRACT

A composition containing salts of chlorogenic acid, caffeic acid, cynarine and isomers thereof capable of inducing a pleasant sweet taste in non-sweet foodstuffs.

9 Claims, No Drawings

3,924,017

SWEETNESS INDUCER

RELATED U.S. APPLICATION DATA

Continuation-in-part of Ser. No. 276,271, filed July 28, 1972 now abandoned.

BACKGROUND OF THE INVENTION

The present invention relates to sweetness inducers. More specifically, it relates to the unique ability of salts of chlorogenic acid, caffeic acid, cynarine and the isomers thereof to effect a sweet taste in non-sweet foodstuffs, systems with reduced sweetness intensities and their incorporation in the same.

Chlorogenic acid, caffeic acid and cynarine are well-known components of the fruit, leaves and other tissues of dicotyledonous plants such as the artichoke, the former playing an important role in plant metabolism. Consequently they should be acceptable for use in any food or beverage system.

It is known in the prior art that many acids e.g. citric acid, sulfuric acid, hydrochloric acid and the like exhibit after tasting, a sweetness inducing quality after the initial sourness has subsided. (L. M. Bartoschuk, Water Taste in Man, *Perception Psychophysics* v. 3, p 69/72, 1968). However, where such acids undergo structural modification, they are known to lose their sweetness inducing properties.

The drawbacks to using chemically unmodified acids at the levels required for the sweetness inducing properties to become evident are obvious. Firstly, the initial sour taste with which one must contend is undesirable in many food systems and in most cases is difficult to disguise. More importantly, however, is the fact that the required levels of such acids as hydrochloric and sulfuric are physiologically intolerable and therefore cannot be considered for use in edible systems.

In contradistinction, chlorogenic acid, caffeic acid and cynarine do not induce sweetness of themselves as is common with other acids. However, when these particular acids are structurally modified, in this case as a salt, they do exhibit the sweetness inducing property. This completely opposite reaction of chlorogenic acid, caffeic acid and cynarine as compared to other such acids could not have been predicted from their structural configurations and therefore is not immediately apparent.

Being naturally occurring compositions, the salts of these compounds should be acceptable for incorporation into any foodstuff or pharmaceutical system.

SUMMARY OF THE INVENTION

It has been found that salts of chlorogenic acid, caffeic acid, cynarine and the isomers thereof impart to non-sweet foodstuffs a very pleasant sweet character having no inherent sweet taste in themselves. Specifically, salts with base cations such as sodium, magnesium, potassium, calcium, ferric including iron, ammonium and the like of chlorogenic acid, caffeic acid, cynarine and their isomers render a sweet taste to systems either devoid of sweetness or very low in sweetness such as water and milk respectively.

The compounds of this invention are extremely stable as well as being very soluble in both aqueous and non-aqueous media such as glycerol, propylene glycol, 1,3-butylene glycol and the like. This makes the non-toxic salts of this invention ideal for incorporation into systems such as chewing gum where a longer lasting and pleasant sweetness is desired. One may also conceive of such compounds being incorporated in freeze-dried form into a tablet or lozenge which would not only cause a sweet sensation to be experienced after having allowed the medicinal lozenge to dissolve in the mouth but would effectively mask any unpleasant taste of and impart a sweet taste to non-sweet foodstuffs, beverages, pharmaceuticals and the like which are subsequently consumed.

It is therefore a principal object of this invention to provide a composition which when incorporated into non-sweet or semi-sweet systems, in either a liquid or dried form will impart to that system or any such system immediately consumed thereafter a pleasant sweet taste.

DESCRIPTION OF THE INVENTION

Chlorogenic acid, caffeic acid, cynarine and their isomers are naturally occurring compounds, the potassium salts of chlorogenic acid and caffeic acid being natural components of the artichoke and readily extracted therefrom. It has been found that in addition to the salts of chlorogenic acid, caffeic acid and cynarine, said salts of their isomers neochlorogenic acid and isochlorogenic acid respectively also exhibit this sweetness inducing property.

Additional salts were tested. Salts such as citrate, malate and the like were examined and found not to exhibit this unique sweetness inducing property. From all indications therefore, only salts of chlorogenic acid, caffeic acid, cynarine and their isomers demonstrate this property.

Essentially, the compositions of this invention are readily prepared by suspending the unsubstituted acid in water after which a sufficient amount of a non-toxic edible base such as an alkaline earth, alkaline metal, ammonium-based compounds or the like added to solubilize the acid, which base may be admixed with an edible carrier, the pH being subsequently adjusted to a range of between four and eight in order to abolish the sour taste of the acid.

As little as 0.3 – 0.5 percent of the acid salt itself is needed in some instances for the induction of sweetness to be observed. However, this is in the case of more sensitive tasters, the average individual having a detection range between 1 and 3 percent. Consequently, when incorporating the compounds of this invention into non-aqueous media, all that is required is that the concentration of the salt solution to be added is sufficient to render a final concentration of at least 0.3–0.5 percent and preferably between 2 and 4 percent.

When the salts of this invention are to be utilized in dry form for incorporation into solid systems or the like, the solution of the acid salt is preferably freeze-dried. The compositions of this invention are readily oxidized by air. Consequently, spray drying and drum drying tend to lessen the activity of said compositions due to the slight oxidation that takes place during these processes. The freeze-dried forms of the compositions of this invention, however, maintain their activity and are stable for an indefinite length of time at room temperature.

It has been determined that the longer one keeps a compound of this invention in the mouth, the more intense the sweetness induced. This finds significant utility in foodstuffs such as chewing gum where the problem of rapidly decreasing sweetness is not only alleviated but a product having a longer-lasting and possibly increasing sweetness intensity is derived.

In accordance with this invention, the salts of chlorogenic acid, caffeic acid, cynarine and their isomers, the potassium salts being the preferred embodiment of the same, find utility in any non-sweet foodstuff, pharmaceutical or the like which commonly is in the mouth for a period of time and in which a sweet taste is desired such as chewing gum, medicinal lozenges, aspirin-containing gums and the like. Their commercial availability as well as their ready extractability from natural systems makes them economically feasible as well.

EXAMPLE I

Three grams of caffeic acid was suspended in 70 ml of water and enough potassium hydroxide added to solubilize the acid, and to adjust the pH to 5 to destroy the sour taste of the acid. Enough water was subsequently added to bring the final volume to 100 ml.

A small amount of this solution was placed in the mouth for a period of ½ min. After expelling this solution, water was taken into the mouth and found to taste intensely sweet.

EXAMPLE II

Two grams of chlorogenic acid was suspended in 50 ml of water. Approximately 0.5 gms of potassium carbonate was added to solubilize the acid after which the pH was adjusted to 6.0. Water was added to the solution in order to bring the final volume to 100 ml.

A small amount of the salt solution was placed in the mouth for approximately one minute. After expelling this solution from the mouth, milk was subsequently sampled and was found to taste intensely sweet.

EXAMPLE III

Caffeic acid is extracted from artichoke as follows: 250 g (9 oz) of frozen artichoke hearts are boiled in 60 ml of water for 10 minutes. To the entire mixture is added 100 ml of water and it is transferred to a Waring blender. After blending it at high speed for 5 minutes, the suspension is transferred into a beaker and 150 ml of ethanol is added.

After 1 hr. of stirring, the suspension is centrifuged at about 7,700 × G for 30 minutes. The volume of the supernatant is then reduced in vacuo at 50°C until all ethanol evaporates. The solution is freeze-dried to give 11 g of dry powder which possesses sweetness inducing properties.

EXAMPLE IV

Two grams of cynarine was suspended in 50 ml of water. Approximately 0.5 gms of potassium bicarbonate was added to solubilize the acid after which the pH was adjusted to 6.0. Water was added to the solution in order to bring the final volume to 100 ml.

A small amount of the salt solution was placed in the mouth for approximately one minute. After expelling this solution from the mouth, milk was subsequently sampled and was found to taste intensely sweet.

What is claimed is:

1. A sweetness inducing composition comprising a salt selected from the group consisting of the alkaline earth, sodium, ammonium-based and ferric-based salts of cynarin and combinations thereof.

2. The composition of claim 1 wherein the salt of cynarin is sodium.

3. A food having induced sweetness comprising a foodstuff having incorporated therein an effective amount of a sweetness inducer selected from the group consisting of the alkaline earth, alkali metal, ammonium-based and ferric-based salts of chlorogenic acid, caffeic acid, cynarine, isochlorogenic acid, neochlorogenic acid and combinations thereof.

4. The foodstuff of claim 3 wherein the alkali metal salt is potassium.

5. The sweetness inducing composition of claim 1 wherein the composition is in dry form.

6. The sweetness inducing composition of claim 5 wherein the dry composition is combined with an edible carrier.

7. The sweetness inducing composition of claim 1 wherein the composition is in liquid form.

8. The sweetness inducing composition of claim 7 wherein the liquid composition is combined with an edible carrier.

9. A method of inducing sweetness in foodstuffs comprising employing in the foodstuff an effective amount of a sweetness inducer selected from the group consisting of the alkaline earth, alkali metal, ammonium-based and ferric-based salts of chlorogenic acid, caffeic acid, cynarine, isochlorogenic acid, neochlorogenic acid and combinations thereof.

* * * * *